US012672077B2

(12) United States Patent
Liu et al.

(10) Patent No.: US 12,672,077 B2
(45) Date of Patent: Jun. 30, 2026

(54) MULTIPLE P-MPR REPORTING FOR MAXIMUM PERMISSIBLE EXPOSURE

(71) Applicant: Lenovo (Beijing) Limited, Beijing (CN)

(72) Inventors: Bingchao Liu, Beijing (CN); Lianhai Wu, Beijing (CN); Ran Yue, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 302 days.

(21) Appl. No.: 18/706,369

(22) PCT Filed: Nov. 5, 2021

(86) PCT No.: PCT/CN2021/128876
§ 371 (c)(1),
(2) Date: Apr. 30, 2024

(87) PCT Pub. No.: WO2023/077400
PCT Pub. Date: May 11, 2023

(65) Prior Publication Data
US 2025/0016693 A1 Jan. 9, 2025

(51) Int. Cl.
*H04W 52/36* (2009.01)
(52) U.S. Cl.
CPC .................................. *H04W 52/365* (2013.01)
(58) Field of Classification Search
CPC ... H04W 24/08; H04W 72/23; H04W 52/367; H04W 52/365; H04W 56/001;
(Continued)

(56) References Cited

U.S. PATENT DOCUMENTS

2021/0226751 A1 7/2021 Zhang et al.
2021/0243630 A1 8/2021 Bai et al.
(Continued)

FOREIGN PATENT DOCUMENTS

WO 2021159266 A1 8/2021
WO 2021159284 A1 8/2021
(Continued)

OTHER PUBLICATIONS

Examination Report issued in GB2410085.1, mailed Jan. 21, 2026, 6 pages.
(Continued)

*Primary Examiner* — Ajibola A Akinyemi
(74) *Attorney, Agent, or Firm* — FIG. 1 Patents

(57) ABSTRACT

Methods (300, 400) and apparatuses for MPE P-MPR reporting are disclosed. In one embodiment, a method (300) of a UE comprises selecting, in response to MPE event being detected, N SSB or CSI-RS resources according to the virtual PH of each SSB or CSI-RS resource within a candidate resource pool for a cell, where N is an integer equal to or larger than 1, wherein each virtual PH is computed by (I) where (II) is computed assuming MPR=0 dB, A-MPR=0 dB, $\Delta T_c=0$ and P-MPR is the virtual P-MPR of there source, PL $(q_d)$ is the DL channel pathloss calculated by taking the SSB or CSI-RS resource as the PL-RS, $P_{O\_PUSCH,\ b,\ f,\ c}$ and $\alpha$ are obtained by the power control parameters used for PUSCH associated with the current indicated UL TCI state with separate DL and UL TCI or the joint DL/UL TCI state with joint DL/UL TCI, or it is assumed that $P_{O\_PUSCH,b,f,c}=0$ and $\alpha=1$, and $f_{b,f,c}=0$ (302); and transmitting an MPE MAC CE including P-MPR of the MPE event and N pairs of virtual P-MPR and SSBRI or CRI, each SSBRI or CRI corresponds to one of the selected N SSB or CSI-RS resources (304).

20 Claims, 3 Drawing Sheets

| P | R | PH(Type 1, PCell) |
|---|---|---|
| MPE or R | | $P_{CMAX,f,c}$ |

(58) Field of Classification Search
CPC ........... H04W 72/1263; H04W 72/535; H04W 72/542; H04W 74/0833; H04W 74/0836; H04W 76/27; H04W 76/30; H04W 24/10
USPC ......................................................... 455/522
See application file for complete search history.

(56) References Cited

U.S. PATENT DOCUMENTS

| | | | | |
|---|---|---|---|---|
| 2022/0046635 A1* | 2/2022 | Liou | .................... | H04B 7/0691 |
| 2022/0124660 A1* | 4/2022 | Cheng | ............... | H04W 56/0045 |
| 2023/0396307 A1* | 12/2023 | Bhamri | ............. | H04B 7/06952 |
| 2025/0321320 A1* | 10/2025 | Jeon | ........................ | G01S 7/021 |

FOREIGN PATENT DOCUMENTS

| | | |
|---|---|---|
| WO | 2021188764 A1 | 9/2021 |
| WO | 2021207562 A1 | 10/2021 |
| WO | 2021207567 A1 | 10/2021 |

OTHER PUBLICATIONS

Interdigital, "Summary of MPE Mitigation in FR2", 3GPP WG2 Meeting #110-e, R2-200xxxx, Jun. 1, 2020, 10 pages.
"Extended European Search Report", EP Application No. 21962915.1, Jun. 6, 2025, 9 pages.
Ericsson, et al., "Miscellaneous non-controversial corrections Set IX", 3GPP TSG-RAN WG2 Meeting #113e, R2-2102381, Electronic Meeting, Jan. 2021, 926 pages.
ZTE, "Enhancements on Multi-beam Operation", 3GPP TSG RAN WG1 Meeting #106bis-e, R1-2108870, e-Meeting, Oct. 11, 2021, 26 pages.
PCT/CN2021/128876 , "International Preliminary Report on Patentability", International Application No. PCT/CN2021/128876, May 2, 2024, 5 pages.
PCT/CN2021/128876 , "International Search Report and Written Opinion", International Application No. PCT/CN2021/128876, Jul. 27, 2022, 8 pages.

* cited by examiner

| P | R | PH(Type 1, PCell) |
|---|---|---|
| MPE or R | | $P_{CMAX,f,c}$ |

| P | R | PH(Type 1, PCell) |
|---|---|---|
| MPE or R | | $P_{CMAX,f,c}$ |
| $P_0$ | $MPE_0$ or R | SSBRI/CRI 0 |
| $P_1$ | $MPE_1$ or R | SSBRI/CRI 1 |
| $P_2$ | $MPE_2$ or R | SSBRI/CRI 2 |
| $P_3$ | $MPE_3$ or R | SSBRI/CRI 3 |

300

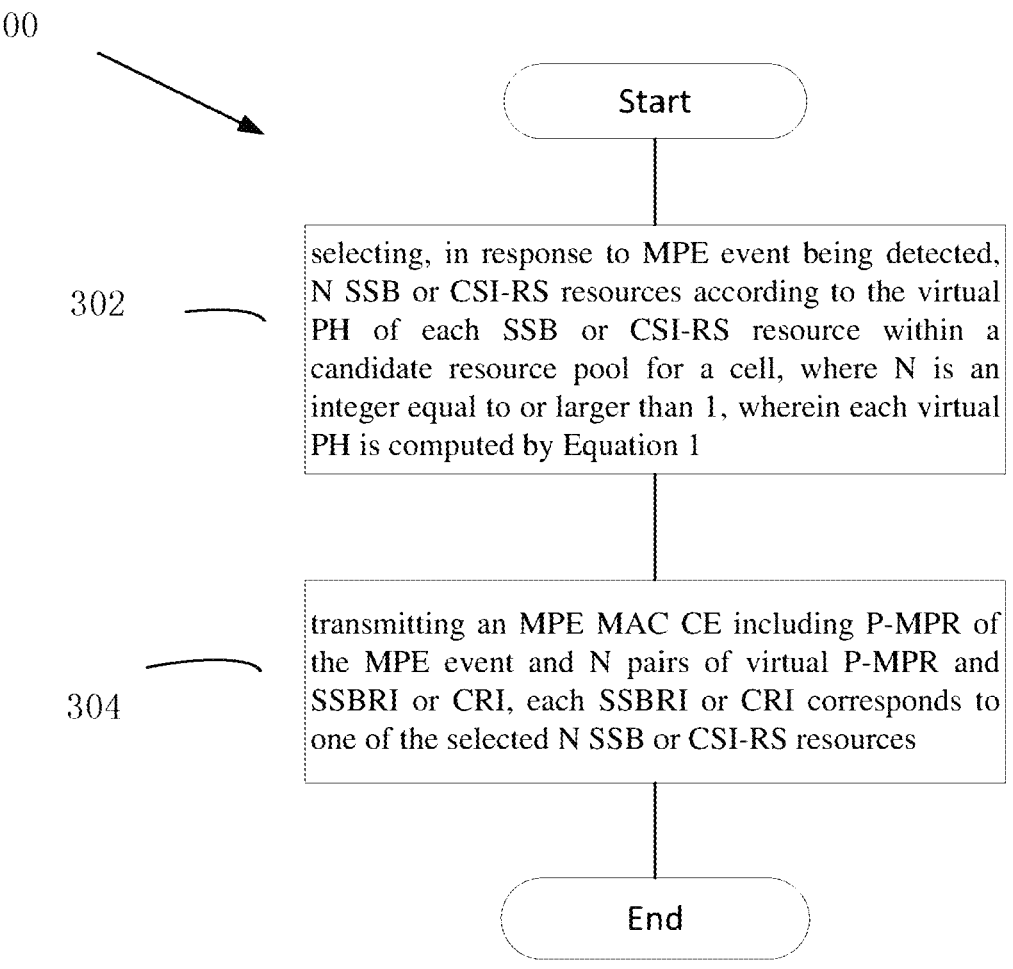

302

Start selecting, in response to MPE event being detected, N SSB or CSI-RS resources according to the virtual PH of each SSB or CSI-RS resource within a candidate resource pool for a cell, where N is an integer equal to or larger than 1, wherein each virtual PH is computed by Equation 1

304 transmitting an MPE MAC CE including P-MPR of the MPE event and N pairs of virtual P-MPR and SSBRI or CRI, each SSBRI or CRI corresponds to one of the selected N SSB or CSI-RS resources End

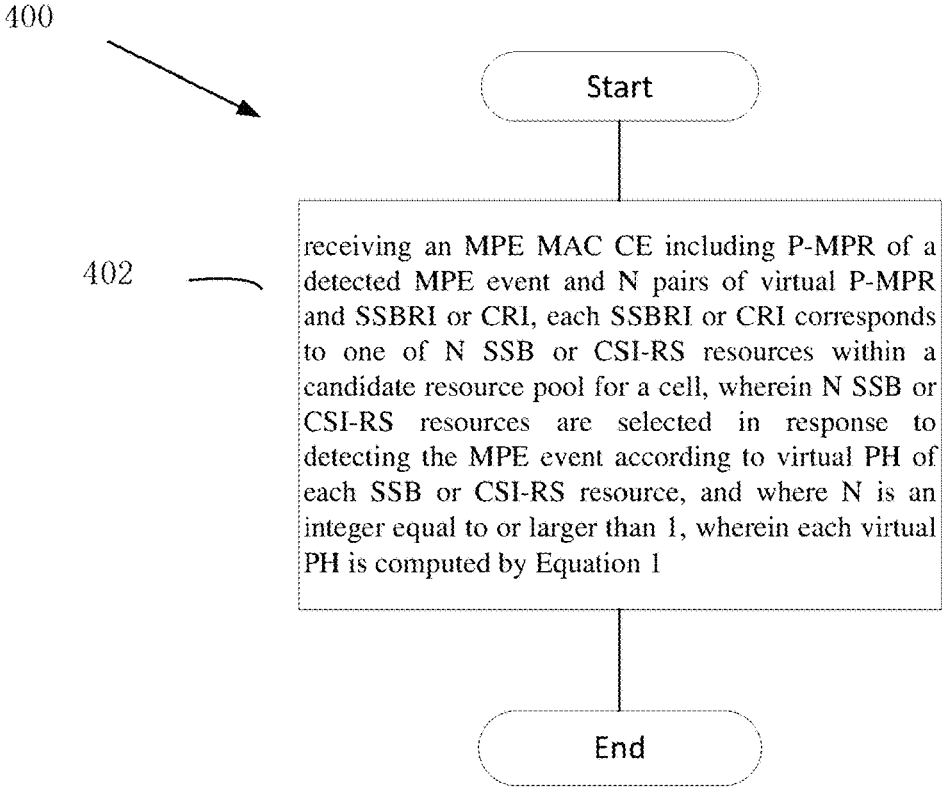

receiving an MPE MAC CE including P-MPR of a detected MPE event and N pairs of virtual P-MPR and SSBRI or CRI, each SSBRI or CRI corresponds to one of N SSB or CSI-RS resources within a candidate resource pool for a cell, wherein N SSB or CSI-RS resources are selected in response to detecting the MPE event according to virtual PH of each SSB or CSI-RS resource, and where N is an integer equal to or larger than 1, wherein each virtual PH is computed by Equation 1

Figure 4

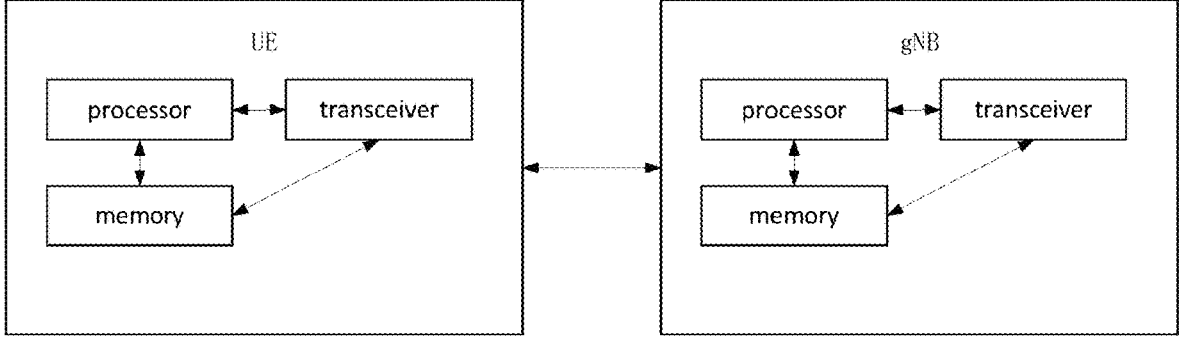

Figure 5

MULTIPLE P-MPR REPORTING FOR MAXIMUM PERMISSIBLE EXPOSURE

FIELD

The subject matter disclosed herein generally relates to wireless communications, and more particularly relates to methods and apparatuses for multiple P-MPR reporting for maximum permissible exposure (MPE).

BACKGROUND

The following abbreviations are herewith defined, at least some of which are referred to within the following description: New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Evolved Node B (eNB), Next Generation Node B (gNB), Uplink (UL), Downlink (DL), Central Processing Unit (CPU), Graphics Processing Unit (GPU), Field Programmable Gate Array (FPGA), Orthogonal Frequency Division Multiplexing (OFDM), Radio Resource Control (RRC), User Entity/ Equipment (Mobile Terminal), Transmitter (TX), Receiver (RX), Power management Maximum Power Reduction (P-MPR), maximum permissible exposure (MPE), Power Headroom Report (PHR), Medium Access Control (MAC), MAC control element (MAC CE), logical channel ID (LCID), power headroom (PH), TS (Technical Specification) (TS refers to 3GPP Technical Specification in this disclosure), uplink shared channel (UL-SCH), Physical Uplink Shared Channel (PUSCH), Physical Uplink Control Channel (PUCCH), Evolved-UMTS Terrestrial Radio Access (E-UTRA), eNB NR Dual Connection (EN-DC), NR CNB Dual Connection (NE-DC), NG (Next Generation)-eNB NR Dual Connection (NGEN-DC), Sounding Reference Signal (SRS), frequency range 2 (FR2): indicating a frequency range of 24.25 GHz~52.6 GHz, frequency range 1 (FR1): indicating a frequency range of 450 MHZ~6 GHZ, transmission reception point (TRP), channel state information reference signal (CSI-RS), CSI-RS resource indicator (CRI), quasi co-location (QCL), quasi co-located (QCLed), synchronization signal (SS), Synchronization Signal and PBCH block (SSB), physical broadcast channel (PBCH), SS/PBCH block indicator (SSBRI), information element (IE), Transmission Configuration Indication (TCI), band width part (BWP).

A UE can configure its maximum output power $P_{CMAX,f,\,c}$ for carrier f of a serving cell c. However, to ensure compliance with applicable electromagnetic power density exposure requirements (e.g. in the condition that proximity detection is used to address such requirements that require a lower maximum output power) and to address unwanted emissions and/or self-defense requirements, the UE has to reduce its maximum output power. A reduction to the maximum output power is applied. The reduction to the maximum output power (which is achieved by the power management maximum power reduction (P-MPR)) means a power to be reduced from the maximum output power. When a measured $P\text{-}MPR_{f,c}$ for carrier f of a serving cell c is equal to or larger than a pre-configured threshold (e.g. an event triggered threshold (configured by higher layer parameter mpe-Threshold)), if a prohibit timer (e.g. mpe-Probibit-Timer) expires or has expired, an MPE (maximum permissible exposure) event is detected. It means that P-MPR (e.g.

$P\text{-}MPR_{f,c}$) is equal to or larger than a maximum permissible reduction to the maximum output power. When the MPE event is detected, a MPE P-MPR reporting is triggered. In the MPE P-MPR reporting, an absolute P-MPR value shall be reported to the base station (e.g. gNB).

The absolute P-MPR value can be reported from the UE to the base station by sending a Single Entry PHR MAC CE. The Single Entry PHR MAC CE is identified by a MAC subheader with a dedicated LCID as specified in FIG. 1.

The Single Entry PHR MAC CE has a fixed size and consists of two octets defined as follows:

R: Reserved bit, set to 0.

Power Headroom (PH): This field indicates the power headroom level. The length of the field is 6 bits. The reported PH and the corresponding power headroom levels are shown in Table 1 (the corresponding measured values in dB are specified in 3GPP Technical Specification TS 38.133 V16.3.0). TS is an abbreviation for Technical Specification, and refers to 3GPP Technical Specification in the following description.

TABLE 1

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| . . . | . . . |
| 60 | POWER_HEADROOM_60 |
| 61 | POWER_HEADROOM_61 |
| 62 | POWER_HEADROOM_62 |
| 63 | POWER_HEADROOM_63 |

Power Headroom (PH) has three types:

Type 1 power headroom: it refers to the difference between the nominal UE maximum transmit power and the estimated power for UL-SCH (uplink shared channel) transmission per activated serving cell. Type 1 power headroom for an activated serving cell may be calculated based on a reference PUSCH transmission. For example, a UE may be configured with multiple PUSCH power control parameter sets each of which has an index j. When close loop power control is enabled for the UE, two PUSCH power control adjustment states, each of which has an index l, are supported. For PUSCH transmission occasion i on active UL BWP b of carrier f of serving cell c, if the PUSCH is transmitted using PUSCH power control parameter set configuration with index j and PUSCH power control adjustment state with index l, the UE computes the Type 1 power headroom as $$PH_{Type1,b,f,c}(i, j, q_d, l) = \tilde{P}_{CMAX,f,c}(i) - \{P_{O\_PUSCH,b,f,c}(j) + \alpha_{b,f,c}(j) \cdot PL_{b,f,c}(q_d) + f_{b,f,c}(i, l)\} \text{ [dB]}$$

wherein, $\tilde{P}_{CMAX,f,\,c}(i)$ is computed assuming MPR (which is allowed maximum power reduction)=0 dB, A-MPR (which is additional maximum power reduction)=0 dB. P-MPR=0 dB, and $\Delta T_C$ (which is allowed operating band edge transmission power relaxation)=0 dB, where MPR, A-MPR, P-MPR and $\Delta T_C$ are defined in TS 38.101-1 V16.3.0, TS 38.101-2 V16.3.0 and TS 38.101-3 V16.3.0; the remaining parameters are defined in Clause 7.1.1 of TS 38.213 V16.3.0, where

3

$P_{O\_PUSCH,b, f, c}(j)$ and $\alpha_{b, f, c}(j)$ are obtained using $P_{O\_NOMINAL\_PUSCH,f,c}(0)$ and p0-PUSCH-Alpha-SetId=0; $PL_{b, f, c}(q_d)$ is obtained using pusch-Pathloss-ReferenceRS-Id=0; and l=0.

Type 2 power headroom: it refers to the difference between the nominal UE maximum transmit power and the estimated power for UL-SCH and PUCCH transmission on SpCell of the other MAC entity (i.e. E-UTRA MAC entity in EN-DC (eNB NR Dual Connection), NE-DC (NR eNB Dual Connection), and NGEN-DC (Next Generation eNB NR Dual Connection) cases).

Type 3 power headroom: it refers to the difference between the nominal UE maximum transmit power and the estimated power for SRS (Sounding Reference Signal) transmission per activated Serving Cell. Type 3 power headroom for an activated serving cell may be calculated based on a reference SRS transmission. For example, for SRS transmission occasion i on UL BWP b of carrier f of serving cell c, and if the UE is not configured for PUSCH transmissions on UL BWP b of carrier f of serving cell c and an SRS resource for the reference SRS transmission is provided by higher layer parameter SRS-Resource, the UE computes a Type 3 power headroom report as $$PH_{type3,b,f,c}(i, q_s) = \tilde{P}_{CMAX,f,c}(i) - \{P_{O\_SRS,b,f,c}(q_s) + \alpha_{SRS,b,f,c}(q_s) \cdot PL_{b,f,c}(q_d) + h_{b,f,c}(i)\} \text{ [dB]}$$

wherein, $q_s$ is an SRS resource set corresponding to SRS-ResourceSetId=0 for UL BWP b; $P_{O\_SRSb, f, c}(q_s)$, $\alpha_{SRS,f,c}(q_s)$, $PL_{b, f, c}(q_d)$ and $h_{b, f, c}(i)$ are defined in Clause 7.3.1 of TS 38.213 V16.3.0 with corresponding values obtained from SRS-ResourceSetId=0 for UL BWP b; $\tilde{P}_{CMAX,f, c}(i)$ is computed assuming MPR=0 dB, A-MPR=0 dB, P-MPR=0 dB and $\Delta T_C$=0 dB, where MPR, A-MPR, P-MPR and $\Delta T_C$ are defined in TS 38.101-1 V16.3.0, TS 38.101-2 V16.3.0 and TS 38.101-3 V16.3.0.

P: If a higher layer parameter mpe-Reporting-FR2, which is used to enable the MPE detection, is configured and the serving cell operates on FR2, the MAC entity shall set this field to 0 if the applied P-MPR value, to meet MPE requirements, as specified in TS 38.101-2 V16.3.0, is less than P-MPR_00 as specified in TS 38.133 V16.3.0 and to 1 otherwise. If mpe-Reporting-FR2 is not configured or the serving cell operates on FR1, this field indicates whether power backoff is applied due to power management. The MAC entity shall set the P field to 1 if the corresponding $P_{CMAX,f, c}$ field would have had a different value if no power backoff due to power management had been applied.

$P_{CMAX,f, c}$: This field indicates the $P_{CMAX,f, c}$ used for calculation of the preceding PH field. The reported $P_{CMAX,f, c}$ and the corresponding nominal UE transmit power levels are shown in Table 2 (the corresponding measured values in dBm are specified in TS 38.133 V16.3.0).

TABLE 2

| $P_{CMAX, f, c}$ | Nominal UE transmit power level |
|---|---|
| 0 | PCMAX_C_00 |
| 1 | PCMAX_C_01 |
| 2 | PCMAX_C_02 |
| . . . | . . . |

4

TABLE 2-continued

| $P_{CMAX, f, c}$ | Nominal UE transmit power level |
|---|---|
| 61 | PCMAX_C_61 |
| 62 | PCMAX_C_62 |
| 63 | PCMAX_C_63 |

MPE: If mpe-Reporting-FR2 is configured, and the serving cell operates on FR2, and if the P field is set to 1, this field indicates the applied power backoff (i.e. the absolute P-MPR value) to meet MPE requirements, as specified in TS 38.101-2 V16.3.0. This field indicates an index to Table 3 and the corresponding measured values of P-MPR levels in dB are specified in TS 38.133 V16.3.0. The length of the field is 2 bits. If mpe-Reporting-FR2 is not configured, or if the Serving Cell operates on FR1, or if the P field is set to 0, R bits are present instead. Table 3

| MPE | Measured P-MPR value |
|---|---|
| 0 | P-MPR_00 |
| 1 | P-MPR_01 |
| 2 | P-MPR_02 |
| 3 | P-MPR_03 |

As a whole, the MPE field of the PHR MAC CE can be used to report the absolute P-MPR value when an MPE event is detected on the serving cell. The reporting of the absolute P-MPR value can be referred to as P-MPR reporting.

In NR Release 17, to facilitate MPE mitigation, it is agreed that, in addition to the existing field in the PHR MAC CE illustrated in FIG. 1, N (N>=1, e.g. N=1, 2, 3 or 4) pairs of virtual P-MPR and SSBRI or CRI are reported, where each of the N SSBRIs or CRIs indicates a resource selected by the UE from a candidate resource pool configured via RRC signaling, wherein each resource in the resource pool can be an SSB resource or an NZP CSI-RS resource. However, it is yet to be determined how to select the N SSBRIs or CRIs.

This disclosure targets enhancement of MPE P-MPR reporting.

BRIEF SUMMARY

Methods and apparatuses for MPE P-MPR reporting are disclosed.

In one embodiment, a method of a UE is disclosed. The method comprises selecting, in response to MPE event being detected, N SSB or CSI-RS resources according to the virtual PH of each SSB or CSI-RS resource within a candidate resource pool for a cell, where N is an integer equal to or larger than 1, wherein each virtual PH is computed by $PH_v = \tilde{P}_{c,max,f, c} - \{P_{O\_PUSCH,b, f, c} + \alpha \cdot PL(q_d) + f_{b, f, c}\}$, where $\tilde{P}_{c,max,f, c}$ is computed assuming MPR=0 dB, A-MPR=0 dB, $\Delta T_c$=0 and P-MPR is the virtual P-MPR of the resource, $PL(q_d)$ is the DL channel pathloss calculated by taking the SSB or CSI-RS resource as the PL-RS, $P_{O\_PUSCH,b, f, c}$ and $\alpha$ are obtained by the power control parameters used for PUSCH associated with the current indicated UL TCI state with separate DL and UL TCI or the joint DL/UL TCI state with joint DL/UL TCI, or it is assumed that $P_{O\_PUSCH,b, f, c}$=0 and $\alpha$=1, and $f_{b, f, c}$=0; and transmitting an MPE MAC CE including P-MPR of the MPE event and N pairs of virtual P-MPR and SSBRI or CRI, each SSBRI or CRI corresponds to one of the selected N SSB or CSI-RS resources.

In one embodiment, the MPE MAC CE includes one additional bit for each pair of virtual P-MPR and SSBRI or CRI to indicate whether the virtual P-MPR is less than 3 dBm. Each SSB or CSI-RS resource is indicated by an SSBRI/CRI field that has a bit width depending on the maximum number of SSB or CSI-RS resources within the candidate resource pool for the cell. In particular, the SSBRI/CRI field with value k indicates the $(k+1)^{th}$ resource configured in the candidate resource pool for the cell.

In another embodiment, the method further comprises determining a UL TCI state or a UL TX beam for UL transmission after transmitting the MPE MAC CE. In particular, after Y symbols from a last symbol of reception of a PDCCH carrying a DCI, that has a toggled NDI field value, scheduling a PUSCH transmission with the same HARQ process number as that for the transmission of the PUSCH carrying the MPE MAC CE, the UL TCI state including, as spatial relation, the DL RS indicated by a first reported SSBRI or CRI among the reported SSBRI(s) or CRI(s), the indicated SSB or CSI-RS resource(s) of which are included in the UL TCI states for UL transmission is determined as the common UL TCI state, where Y is preconfigured or reported as part of UE capability. Alternatively, after Y symbols from a last symbol of reception of a PDCCH carrying a DCI, that has a toggled NDI field value, scheduling a PUSCH transmission with the same HARQ process number as that for the transmission of the PUSCH carrying the MPE MAC CE, the SSB or CSI-RS resource indicated by a first reported SSBRI or CRI is used to determine the UL TX beam for PUSCH and PUCCH transmission before receiving a joint DL/UL TCI state updating command or a UL TCI state updating command, where Y is preconfigured or reported as part of UE capability.

In some embodiment, the method may further comprise receiving a DCI to trigger an aperiodic CSI reporting for UL beam management after transmitting the MPE MAC CE. The triggered aperiodic CSI reporting is associated with an aperiodic CSI resource set containing at least one CSI-RS resource with higher layer parameter repetition set to on, and the at least one CSI-RS resource is a CSI-RS resource indicated by the SSBRI/CRI field of the MPE MAC CE, or QCLed with an SSB or CSI-RS resource indicated by the SSBRI/CRI field of the MPE MAC CE, or a CSI-RS resource that has the same source QCL-TypeD RS as a CSI-RS resource indicated by the SSBRI/CRI field of the MPE MAC CE.

In some embodiment, the method may further comprise transmitting a capability on the maximum number of SSB or CSI-RS resources that can be configured in the resource pool for the cell for MPE detection.

In another embodiment, a UE comprises a processor that selects, in response to MPE event being detected, N SSB or CSI-RS resources according to the virtual PH of each SSB or CSI-RS resource within a candidate resource pool for a cell, where N is an integer equal to or larger than 1, wherein each virtual PH is computed by $PH_v = \tilde{P}_{c,max,f,\ c} - \{P_{O\_PUSCH,b,f,\ c} + \alpha \cdot PL(q_d) + f_{b,f,\ c}\}$, where $\tilde{P}_{c,max,f,\ c}$ is computed assuming MPR=0 dB, A-MPR=0 dB, $\Delta T_c=0$ and P-MPR is the virtual P-MPR of the resource, $PL(q_d)$ is the DL channel pathloss calculated by taking the SSB or CSI-RS resource as the PL-RS, $P_{O\_PUSCH,b,f,\ c}$ and $\alpha$ are obtained by the power control parameters used for PUSCH associated with the current indicated UL TCI state with separate DL and UL TCI or the joint DL/UL TCI state with joint DL/UL TCI, or it is assumed that $P_{O\_PUSCH,b,f,\ c}=0$ and $\alpha=1$, and $f_{b,f,\ c}=0$; and a transmitter that transmits an MPE MAC CE including P-MPR of the MPE event and N pairs of virtual P-MPR and SSBRI or CRI, each SSBRI or CRI corresponds to one of the selected N SSB or CSI-RS resources.

In one embodiment, a method at a base unit comprises receiving an MPE MAC CE including P-MPR of a detected MPE event and N pairs of virtual P-MPR and SSBRI or CRI, each SSBRI or CRI corresponds to one of N SSB or CSI-RS resources within a candidate resource pool for a cell, wherein N SSB or CSI-RS resources are selected in response to detecting the MPE event according to virtual PH of each SSB or CSI-RS resource, and where N is an integer equal to or larger than 1, wherein each virtual PH is computed by $PH_v = \tilde{P}_{c,max,f,\ c} - \{P_{O\_PUSCH,b,f,\ c} + \alpha \cdot PL(q_d) + f_{b,f,\ c}\}$, where $\tilde{P}_{c,max,f,\ c}$ is computed assuming MPR=0 dB, A-MPR=0 dB, $\Delta T_c=0$ and P-MPR is the virtual P-MPR of the resource, $PL(q_d)$ is the DL channel pathloss calculated by taking the SSB or CSI-RS resource as the PL-RS, $P_{O\_PUSCH,b,f,\ c}$ and $\alpha$ are obtained by the power control parameters used for PUSCH associated with the current indicated UL TCI state with separate DL and UL TCI or the joint DL/UL TCI state with joint DL/UL TCI, or it is assumed that $P_{O\_PUSCH,b,f,\ c}=0$ and $\alpha=1$, and $f_{b,f,\ c}=0$.

In yet another embodiment, a base unit comprises a receiver that receives an MPE MAC CE including P-MPR of a detected MPE event and N pairs of virtual P-MPR and SSBRI or CRI, each SSBRI or CRI corresponds to one of N SSB or CSI-RS resources within a candidate resource pool for a cell, wherein N SSB or CSI-RS resources are selected in response to detecting the MPE event according to virtual PH of each SSB or CSI-RS resource, and where N is an integer equal to or larger than 1, wherein each virtual PH is computed by $PH_v = \tilde{P}_{c,max,f,\ c} - \{P_{O\_PUSCH,b,f,\ c} + \alpha \cdot PL(q_d) + f_{b,f,\ c}\}$, where $\tilde{P}_{c,max,f,\ c}$ is computed assuming MPR=0 dB, A-MPR=0 dB, $\Delta T_c=0$ and P-MPR is the virtual P-MPR of the resource, $PL(q_d)$ is the DL channel pathloss calculated by taking the SSB or CSI-RS resource as the PL-RS, $P_{O\_PUSCH,b,f,\ c}$ and $\alpha$ are obtained by the power control parameters used for PUSCH associated with the current indicated UL TCI state with separate DL and UL TCI or the joint DL/UL TCI state with joint DL/UL TCI, or it is assumed that $P_{O\_PUSCH,b,f,\ c}=0$ and $\alpha=1$, and $f_{b,f,\ c}=0$.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which:

FIG. 3 is a schematic flow chart diagram illustrating an embodiment of a method;

FIG. 4 is a schematic flow chart diagram illustrating a further embodiment of a method; and FIG. 5 is a schematic block diagram illustrating apparatuses according to one embodiment.

DETAILED DESCRIPTION

Figures 1, 2:
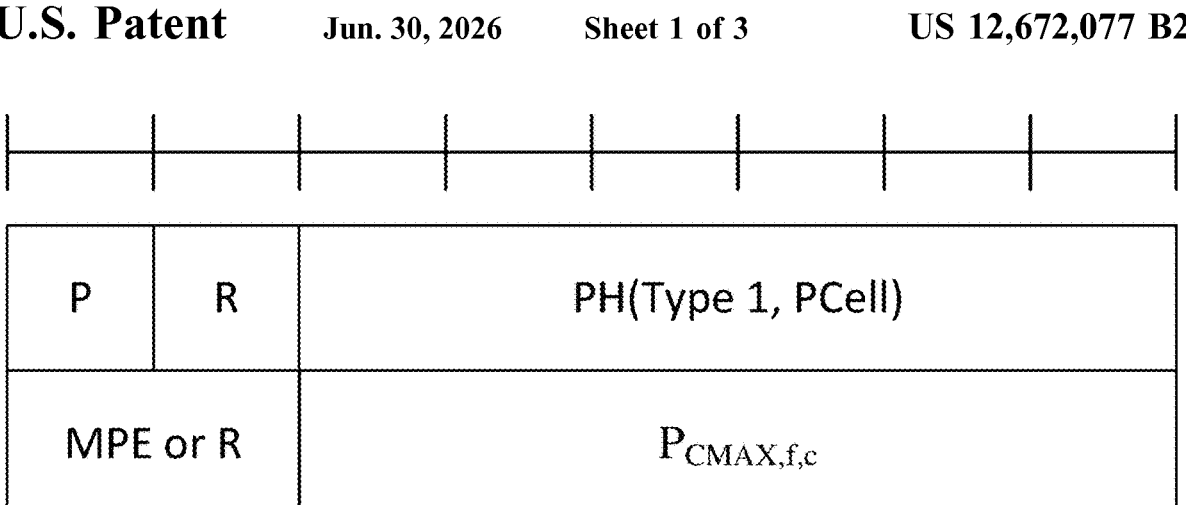
FIG. 1 illustrates a Single Entry PHR MAC CE.
FIG. 2 illustrates an example of MPE MAC CE according to the present disclosure.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

This disclosure relates to enhancement of MPE P-MPR reporting.

1. The Triggering Event of MPE P-MPR Reporting:

In unified TCI framework in single-TRP scenario, UL TX beam for transmission of PUSCH resources and all dedicated PUCCH resources is determined by the indicated joint DL/UL TCI state (if joint DL/UL TCI is configured) or the indicated UL TCI state (if separate DL/UL TCI is configured). In this condition, a single mpe-Threshold can be configured along with the higher layer parameter mpe-Reporting-FR2 to enable MPE reporting. The same MPE triggering event as in NR Release 16 can be reused. In particular, the MPE P-MPR reporting shall be triggered when:

(1) the measured P-MPR applied to meet FR2 MPE requirements as specified in TS 38.101-2 is equal to or larger than mpe-Threshold for at least one activated FR2 Serving Cell since the last transmission of a PHR in this MAC entity; or (2) the measured P-MPR applied to meet FR2 MPE requirements as specified in TS 38.101-2 has changed more than phr-Tx-PowerFactorChange dB for at least one activated FR2 Serving Cell since the last transmission of a PHR due to the measured P-MPR applied to meet MPE requirements being equal to or larger than mpe-Threshold in this MAC entity.

A brief explanation of TCI is as follows:

The UE can be configured with a list of up to M TCI-State configurations to decode PDSCH according to a detected PDCCH with DCI intended for the UE and the given serving cell, where M depends on the UE capability. The TCI-state is configured by the following RRC signaling:

TCI-State

The IE TCI-State associates one or two DL reference signals with a corresponding quasi-colocation (QCL) type.

| TCI-State information element |
|---|

```
TCI-State ::=                    SEQUENCE {
    tci-StateId                      TCI-StateId,
    qcl-Type1                        QCL-Info,
    qcl-Type2                        QCL-Info
OPTIONAL,    -- Need R ...
}
QCL-Info ::=                      SEQUENCE {
    cell                             ServCellIndex
OPTIONAL,    -- Need R
    bwp-Id                           BWP-Id
OPTIONAL, -- Cond CSI-RS-Indicated
    referenceSignal                  CHOICE {
        csi-rs                           NZP-CSI-RS-
ResourceId,
        ssb                              SSB-Index
    },
    qcl-Type                         ENUMERATED {typeA,
typeB, typeC, typeD},
    ...
}
```

Each TCI-State contains parameters for configuring a quasi co-location (QCL) relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

For example, if a TCI-state is configured as TCI-state={CSI-RS #1, QCL-TypeA; CSI-RS #2, QCL-TypeD} and it is indicated for a PDSCH reception, it means that the DM-RS ports of the PDSCH can get the Doppler shift, Doppler spread, average delay, delay spread from the estimation of CSI-RS #1 and the UE receives the PDSCH and the DMRS port using the same spatial RX parameter as that used to receive CSI-RS #2.

For another example, if CSI-RS #1 is QCLed with CSI-RS #2 with QCL-typeD, the UE can obtain the spatial RX parameter (e.g., the DL RX beam or DL RX spatial filter) for reception of CSI-RS #1 according to the spatial RX parameter used for reception of CSI-RS #2.

For yet another example, if CSI-RS #1 and CSI-RS #2 have the same source QCL-typeD RS, CSI-RS #1 and CSI-RS #2 can be received with the same spatial RX parameter (e.g., the DL RX beam or DL RX spatial filter).

Unified TCI framework means that the DL RX beam for DL reception and UL TX beam for UL transmission shall be directly indicated by the TCI state contained in the DCI. Two modes including joint DL/UL TCI or separate DL/UL TCI can be configured for a UE. If joint DL/UL TCI is configured, both DL RX beam for reception of all PDSCHs and PDCCHs and the UL TX beam for transmission of all PUSCHs and PUCCHs are determined by the QCL TypeD RS contained in the indicated joint DL/UL TCI state. If separate DL/UL TCI is configured, the DL RX beam for reception of all PDSCHs and PDCCHs is determined by the QCL TypeD RS contained in the indicated DL TCI state, while the UL TX beam for transmission of all PUSCHs and PUCCHs is determined by the RS contained in the indicted UL TCI state.

2. The Selection of the Reported N Pairs of Virtual P-MPR and SSBRI or CRI:

When MPE P-MPR reporting is triggered, in addition to the P-MPR to be reported by the Single Entry PHR MAC CE as shown in FIG. 1, N pair(s) of virtual P-MPR and SSBRI or CRI are additionally reported, where N>=1 (e.g. N=1, 2, 3 or 4).

Three different alternatives were provided on the selection of N SSB or CSI-RS resources from a candidate resource (e.g. SSB or CSI-RS resource) pool to be reported for a cell configured by RRC signaling for MPE:

Alternative 1: based on L1-RSRP minus P-MPR value for each resource.

Alternative 2: based on calculated virtual PH for each resource.

Alternative 3: based on L1-RSRP for each resource among the resources with P-MPR values less than a threshold.

Incidentally, since each SSB or CSI-RS resource is indicated by an SSBRI or CRI, the selection of N SSB or CSI-RS resources means the same as the selection of N SSBRIs or CRIs indicating the N SSB or CSI-RS resources.

DL beam quality is represented by the measured L1-RSRP for each DL beam, while UL beam quality is represented by the measured power headroom (PH). The motivation of MPE reporting is to recover UL beam when MPE event is detected without triggering beam failure recovery (BFR) procedure, since the DL beam may be still workable when the MPE event is detected. So, the selected (i.e. reported) SSBRIs or CRIs should be considered as being used for determining the recommended UL TX beam(s) which can be used for the subsequent UL transmission. The UL TX beam can be also represented by UL TX spatial filter or spatial relation.

In view of the above, virtual PH, which directly reflects the actual transmission power situation taking into account the required power reductions, can reflect UL beam quality more accurately that L1-RSRP. Accordingly, it is preferable that the UE selects the resources (i.e. N SSBRIs or CRIs indicating the resources) from the candidate resource (e.g. SSB or CSI-RS resource) pool based on the virtual PH of each SSB or CSI-RS resource in the candidate resource pool.

In other words, the present disclosure chooses "Alternative 2" to select the reported N pairs of virtual P-MPR and SSBRI or CRI.

For each SSBRI or CRI (i.e. for each SSB or CSI-RS resource corresponding to the SSBRI or CRI), the virtual PH can be calculated according to $PH_v = \tilde{P}_{c,max,f,\ c} - \{P_{O\_PUSCH,b,\ f,\ c} + \alpha \cdot PL(q_d) + f_{b,\ f,\ c}\}$, where the $\tilde{P}_{c,max,f,\ c}$ is computed assuming MPR=0 dB, A-MPR=0 dB, $\Delta T_c$=0 and P-MPR is the virtual P-MPR determined by the UE for the SSB or CSI-RS resource corresponding to the SSBRI or CRI, $PL(q_d)$ is the DL channel pathloss calculated by taking the SSB or CSI-RS resource corresponding to the SSBRI or CSI as the PL-RS.

$P_{O\_PUSCH,b,\ f,\ c}$ and $\alpha$ (that are power control parameters) can be obtained by the power control parameters used for PUSCH associated with the current indicated UL TCI state (if separate DL/UL TCI is configured) or the joint DL/UL TCI state (if joint DL/UL TCI is configured); or alternatively, it is assumed that $P_{O\_PUSCH,b,\ f,\ c}$=0 and $\alpha$=1, $f_{b,\ f,\ c}$=0.

Note that b refers to the active UL BWP, f refers to the carrier, and c refers to the serving cell.

As can be seen, the UE determines a virtual P-MPR for each SSBRI or CRI. The virtual P-MPR represents an estimated P-MPR value for the SSB or CSI-RS resource corresponding to a given SSBRI or CRI before actual MPE event is detected.

A virtual PH is determined for each resource corresponding to SSBRI or CRI, and each SSBRI or CRI is associated with a virtual P-MPR.

Therefore, the N pairs of virtual P-MPR and SSBRI or CRI can be determined according to the virtual PHs of the SSB or CSI-RS resources corresponding to SSBRIs or CRIs. For example, the N pairs of virtual P-MPR and SSBRI or CRI in which the virtual PHs of the SSB or CSI-RS resources corresponding to SSBRIs or CRIs are the N largest virtual PHs are selected. The virtual P-MPR of an SSBRI or CRI informs the base station (e.g. gNB) of the virtual P-MPR level that will be applied if the beam associated with the SSBRI or CRI is selected or activated as UL TX beam.

3. The Format of MPE MAC CE:

The selected N pairs of virtual P-MPR and SSBRI or CRI are also reported in the MPE P-MPR reporting. That is, in addition to the fields contained in the MAC CE illustrated in FIG. 1, more fields are necessary in the MPE MAC CE.

For each pair of virtual P-MPR and SSBRI or CRI, an MPE field (MPE or R field) with two bits is contained. The mapping of the two bits to P-MPR values are given in Table 4, which is Table 10.1.26.1-1 specified in TS38.133.

Table 4

| Reported value | Measured quantity value | Unit |
|---|---|---|
| P-MPR_00 | 3 ≤ PMP-R < 6 | dBm |
| P-MPR_01 | 6 ≤ PMP-R < 9 | dBm |
| P-MPR_02 | 9 ≤ PMP-R < 12 | dBm |
| P-MPR_03 | 12 ≤ PMP-R | dBm |

Each of the N virtual P-MPRs indicates the estimated P-MPR value for a given beam before actual MPE event is triggered. So, the estimated P-MPR value may be less than 3 dBm. The estimated P-MPR value that is less than 3 dBm cannot be indicated by any of P-MPR_00, P-MPR_01, P-MPR_02 and P-MPR_03 in the above Table 4.

In view of the above, the present disclosure proposes to add an additional field, for each pair of virtual P-MPR and SSBRI or CRI, to indicate whether the measured P-MPR is less than P-MPR_00 (i.e. less than 3 dBm).

An SSBRI/CRI field is necessary for each pair of P-MPR and SSBRI or CRI. The bit width of the SSBRI/CRI field for a carrier is determined by the maximum number of SSB or CSI-RS resources configured within the candidate resource (e.g. SSB or CSI-RS resource) pool in the carrier. SSBRI with value k (k>=0) corresponds to the configured $(k+1)^{th}$ entry of the SSB resource configured in the candidate SSB resource pool for MPE detection. CRI with value k (k>=0) corresponds to the configured $(k+1)^{th}$ entry of the NZP CSI-RS resource configured in the candidate CSI-RS resource pool for MPE detection. For example, if up to 64 SSB resources are be configured in the resource pool, the SSBRI/CRI field (e.g. SSBRI field) has 6 bits. If up to 128 CSI-RS resources can be configured in the resource pool, the SSBRI/CRI field (e.g. CRI field) has 7 bits.

Incidentally, the maximum number of SSB or CSI-RS resources that can be configured in the resource pool is part of UE capability reporting.

FIG. 2 illustrates an example of the MPE MAC CE according to the present disclosure.

As shown in FIG. 2, the MPE MAC CE according to the present disclosure has N+2 octets, where N can be reported by UE capability (N>=1, e.g. N=4 in FIG. 2).

The following fields are included:

R: Reserved bit, set to 0.

Power Headroom (PH): This field indicates the power headroom level. The length of the field is 6 bits.

P: If a higher layer parameter mpe-Reporting-FR2, which is used to enable the MPE detection, is configured and the serving cell operates on FR2, the MAC entity shall set this field to 0 if the applied P-MPR value, to meet MPE requirements, as specified in TS 38.101-2 V16.3.0, is less than P-MPR_00 as specified in TS 38.133 V16.3.0 and to 1 otherwise. If mpe-Reporting-FR2 is not configured or the serving cell operates on FR1, this field indicates whether power backoff is applied due to power management. The MAC entity shall set the P field to 1 if the corresponding $P_{CMAX,f,c}$ field would have had a different value if no power backoff due to power management had been applied.

$P_{CMAX,f,c}$: This field indicates the $P_{CMAX,f,c}$ used for calculation of the preceding PH field. The reported $P_{CMAX,f,c}$ and the corresponding nominal UE transmit power levels are shown in Table 2.

MPE: If mpe-Reporting-FR2 is configured, and the serving cell operates on FR2, and if the P field is set to 1, this field indicates the applied power backoff (i.e. the absolute P-MPR value) to meet MPE requirements, as specified in TS 38.101-2 V16.3.0. This field indicates an index to Table 3 and the corresponding measured values of P-MPR levels in dB are specified in TS 38.133 V16.3.0. The length of the field is 2 bits. If mpe-Reporting-FR2 is not configured, or if the Serving Cell operates on FR1, or if the P field is set to 0, R bits are present instead.

Note that the "P", "R", "PH", "MPE or R" and "$P_{CMAX,f,c}$" fields in the MPE MAC CE according to the present disclosure are the same as those fields in the MAC CE illustrated in FIG. 1.

$P_i$ (i=0 to N−1): If mpe-Reporting-FR2 is configured and the Serving Cell operates on FR2, the MAC entity shall set this field to 0 if the estimated P-MPR value applied for the beam indicated by SSBRI/CRI i field, to meet MPE requirements, is less than P-MPR_00 and to 1 otherwise. $P_i$ field is an example of the additional field for each pair of virtual P-MPR and SSBRI or CRI, to indicate whether the measured P-MPR is less than P-MPR_00 (i.e. less than 3 dBm).

$MPE_i$ (i=0 to N−1): If mpe-Reporting-FR2 is configured, and the Serving Cell operates on FR2, and if the $P_i$ field is set to 1, this field indicates the potential applied power backoff to meet MPE requirements if the beam determined by SSBRI/CRI i field is used as the UL TX beam.

SSBRI/CRI i (i=0 to N−1): This field indicates the $(i+1)_{th}$ SSBRI or CRI which indicates an SSB or CSI-RS resource that can be used to determine the UL TX beam for UL transmission. In the example of FIG. 2, up to 32 SSB or CSI-RS resources can be configured in the candidate resource pool for the serving cell, that is, the bit width of each SSBRI/CRI i field is 5 bits.

4. The Behaviors of the UE and Base Station (e.g. gNB):

Considering that the MPE reporting is triggered when MPE event is detected for the current UL beam, the current UL beam is no longer applicable for subsequent UL transmission. A UL TX beam determined by the SSB or CSI-RS resource corresponding to any of the reported SSBRIs or CRIs can be updated as the UL beam for subsequent UL transmission. The MPE event is reported via an MPE MAC CE. So, the behavior according to the first embodiment is: a UL TX beam (i.e. UL TCI state) corresponding to one of the reported SSBRIs or CRIs is directly updated as the common UL beam (common UL TCI state) for all PUSCH and all dedicated PUCCH transmission after Y symbols from receiving the base station (e.g. gNB)'s acknowledgement (ACK) of the first PUSCH carrying the MPE MAC CE.

In particular, the behaviors according to the first embodiment are different for separate DL/UL TCI and for joint DL/UL TCI.

For separate DL/UL TCI framework, there are two situations:

Situation 1: After Y (where Y can be preconfigured, or be reported as part of UE capability) symbols from a last symbol of reception of a PDCCH carrying a DCI, that has a toggled NDI field value, scheduling a PUSCH transmission with the same HARQ process number as that for the transmission of the PUSCH carrying the MPE MAC CE, the UL TCI state including, as spatial relation, the DL RS indicated by the first reported SSBRI or CRI among the reported SSBRI(s) or CRI(s), the indicated SSB or CSI-RS resource(s) of which are included in some UL TCI states for UL transmission, is directly updated as the UL common TCI state. For example, if CRI #0, CRI #1, CRI #2 and CRI #3 are reported, if CSI-RS #1 and CSI-RS #3 indicated by CRI #1 and CRI #3 are included in two UL TCI states (while CSI-RS #0 and CSI-RS #2 indicated by CRI #0 and CRI #2 are not included in any UL TCI state), the UL TCI state including CSI-RS #1 (that is indicated by CRI #1 that is the first CRI of CRI #1 and CRI #3) is updated as the UL common TCI state for transmission of PUSCH and all dedicated PUCCH.

The DCI having a toggled NDI field value means that the DCI schedules a new transmission. The DCI (having the toggled NDI field value) scheduling a PUSCH transmission with the same HARQ process number as that for the transmission of the PUSCH carrying the MPE MAC CE implies that the MPE MAC CE is successfully received by the base station (e.g. gNB), i.e. ACK of the reception of the MPE MAC CE by the base station.

Situation 2: If each of the DL RSs indicated by all of reported SSBRIs or CRIs is not included by any UL TCI state, the UE shall, before receiving a UL TCI state updating command (which may be a DCI or a MAC CE), use the SSB or CSI-RS resource indicated by the first reported SSBRI or CRI to determine the UL TX spatial filter as well as PL-RS for all PUSCH and all dedicated PUCCH transmission, after Y (where Y can be preconfigured or be reported as part of UE capability) symbols from a last symbol of reception of a PDCCH carrying a DCI, that has a toggled NDI field value, scheduling a PUSCH transmission with the same HARQ process number as that for the transmission of the first PUSCH carrying the MPE MAC CE.

For joint DL/UL TCI framework, the UE shall, before receiving a joint DL/UL TCI state updating command (which may be a DCI or a MAC CE), use the SSB or CSI-RS resource indicated by the first reported SSBRI or CRI to determine the UL TX spatial filter as well as PL-RS for PUSCH and PUCCH transmission, after Y (where Y can be preconfigured) symbols from a last symbol of reception of a PDCCH carrying a DCI, that has a toggled NDI field value, scheduling a PUSCH transmission with the same HARQ process number as that for the transmission of the first PUSCH carrying the MPE MAC CE.

Considering that the MPE issue may impact not only the UL beam, but also the DL Rx beam. So, the behavior according to the second embodiment is: the UE, after sending the MPE MAC CE, expects that the base station (e.g. gNB) triggers an aperiodic UL beam management procedure to avoid the unnecessary BFR procedure. An aperiodic CSI resource set is triggered in the aperiodic UL beam management procedure.

The triggered aperiodic CSI-RS resource set includes at least one CSI-RS resource that is reported by the UE in the MPE MAC CE. This is applicable when CRIs indicating CSI-RS resources are reported in the MPE MAC CE. For example, one or more CSI-RS resources indicated by the reported CRIs are directly configured in the triggered aperiodic CSI-RS resource set.

Alternatively, the triggered aperiodic CSI-RS resource set includes at least one CSI-RS resource that is QCLed with the SSB or CSI-RS resource indicated by the SSBRI/CRI field in the MPE MAC CE. For example, one of the aperiodic CSI-RS resources in the triggered aperiodic CSI-RS resource set is QCLed with one of the SSB or CSI-RS resources indicated by the reported SSBRIs or CRIs with QCL-TypeD; or one of the aperiodic CSI-RS resources in the triggered aperiodic CSI-RS resource set has the same source QCL-TypeD RS with one of the CSI-RS resources indicated by the reported CRIs.

The above-mentioned CSI-RS resources, that are indicated by the CRIs reported by the UE in the MPE MAC CE or QCLed with the SSB or CSI-RS resource indicated by the SSBRI/CRI field in the MPE MAC CE, are configured with higher layer parameter repetition set to 'on' and the reportQuantity set to 'none'. FIG. 3 is a schematic flow chart diagram illustrating an embodiment of a method 300 according to the present application. In some embodiments, the method 300 is performed by an apparatus, such as a remote unit (e.g. UE). In certain embodiments, the method 300 may be performed by a processor executing program code, for example, a microcontroller, a microprocessor, a CPU, a GPU, an auxiliary processing unit, a FPGA, or the like.

The method 300 is a method of a UE, comprising: 302 selecting, in response to MPE event being detected, N SSB or CSI-RS resources according to the virtual PH of each SSB or CSI-RS resource within a candidate resource pool for a cell, where N is an integer equal to or larger than 1, wherein each virtual PH is computed by Equation 1: $PH_v = \tilde{P}_{c,max,f, c} - \{P_{O\_PUSCH,b, f, c} + \alpha \cdot PL(q_d) + f_{b, f, c}\}$, where $\tilde{P}_{c,max,f, c}$ is computed assuming MPR=0 dB, A-MPR=0 dB, $\Delta T_c = 0$ and P-MPR is the virtual P-MPR of the resource, $PL(q_d)$ is the DL channel pathloss calculated by taking the SSB or CSI-RS resource as the PL-RS, $P_{O\_PUSCH,b, f, c}$ and $\alpha$ are obtained by the power control parameters used for PUSCH associated with the current indicated UL TCI state with separate DL and UL TCI or the joint DL/UL TCI state with joint DL/UL TCI, or it is assumed that $P_{O\_PUSCH,b, f, c} = 0$ and $\alpha = 1$, and $f_{b, f, c} = 0$; and 304 transmitting an MPE MAC CE including P-MPR of the MPE event and N pairs of virtual P-MPR and SSBRI or CRI, each SSBRI or CRI corresponds to one of the selected N SSB or CSI-RS resources.

In one embodiment, the MPE MAC CE includes one additional bit for each pair of virtual P-MPR and SSBRI or CRI to indicate whether the virtual P-MPR is less than 3 dBm. Each SSB or CSI-RS resource is indicated by an SSBRI/CRI field that has a bit width depending on the maximum number of SSB or CSI-RS resources within the candidate resource pool for the cell. In particular, the SSBRI/CRI field with value k indicates the $(k+1)^{th}$ resource configured in the candidate resource pool for the cell.

In one embodiment, the method further comprises determining a UL TCI state or a UL TX beam for UL transmission after transmitting the MPE MAC CE. In particular, after Y symbols from a last symbol of reception of a PDCCH carrying a DCI, that has a toggled NDI field value, scheduling a PUSCH transmission with the same HARQ process number as that for the transmission of the PUSCH carrying the MPE MAC CE, the UL TCI state including, as spatial relation, the DL RS indicated by a first reported SSBRI or CRI among the reported SSBRI(s) or CRI(s), the indicated SSB or CSI-RS resource(s) of which are included in the UL TCI states for UL transmission is determined as the common UL TCI state, where Y is preconfigured or reported as part of UE capability. Alternatively, after Y symbols from a last symbol of reception of a PDCCH carrying a DCI, that has a toggled NDI field value, scheduling a PUSCH transmission with the same HARQ process number as that for the transmission of the PUSCH carrying the MPE MAC CE, the SSB or CSI-RS resource indicated by a first reported SSBRI or CRI is used to determine the UL TX beam for PUSCH and PUCCH transmission before receiving a joint DL/UL TCI state updating command or a UL TCI state updating command, where Y is preconfigured or reported as part of UE capability.

In one embodiment, the method may further comprise receiving a DCI to trigger an aperiodic CSI reporting for UL beam management after transmitting the MPE MAC CE. The triggered aperiodic CSI reporting is associated with an aperiodic CSI resource set containing at least one CSI-RS resource with higher layer parameter repetition set to on, and the at least one CSI-RS resource is a CSI-RS resource indicated by the SSBRI/CRI field of the MPE MAC CE, or QCLed with an SSB or CSI-RS resource indicated by the SSBRI/CRI field of the MPE MAC CE, or a CSI-RS resource that has the same source QCL-TypeD RS as a CSI-RS resource indicated by the SSBRI/CRI field of the MPE MAC CE.

In some embodiment, the method may further comprise transmitting a capability on the maximum number of SSB or CSI-RS resources that can be configured in the resource pool for the cell for MPE detection.

FIG. 4 is a schematic flow chart diagram illustrating an embodiment of a method 400 according to the present application. In some embodiments, the method 400 is performed by an apparatus, such as a base unit. In certain embodiments, the method 400 may be performed by a processor executing program code, for example, a micro-controller, a microprocessor, a CPU, a GPU, an auxiliary processing unit, a FPGA, or the like.

The method 400 may include 402 receiving an MPE MAC CE including P-MPR of a detected MPE event and N pairs of virtual P-MPR and SSBRI or CRI, each SSBRI or CRI corresponds to one of N SSB or CSI-RS resources within a candidate resource pool for a cell, wherein N SSB or CSI-RS resources are selected in response to detecting the MPE event according to virtual PH of each SSB or CSI-RS resource, and where N is an integer equal to or larger than 1, wherein each virtual PH is computed by Equation 1: $PH_v = \tilde{P}_{c,max,f,\ c} - \{P_{O\_PUSCH,b,\ f,\ c} + \alpha \cdot PL(q_d) + f_{b,\ f,\ c}\}$, where $\tilde{P}_{c,max,f,\ c}$ is computed assuming MPR=0 dB, A-MPR=0 dB, $\Delta T_c = 0$ and P-MPR is the virtual P-MPR of the resource, $PL(q_d)$ is the DL channel pathloss calculated by taking the SSB or CSI-RS resource as the PL-RS, $P_{O\_PUSCH,b,\ f,\ c}$ and $\alpha$ are obtained by the power control parameters used for PUSCH associated with the current indicated UL TCI state with separate DL and UL TCI or the joint DL/UL TCI state with joint DL/UL TCI, or it is assumed that $P_{O\_PUSCH,b,\ f,\ c} = 0$ and $\alpha = 1$, and $f_{b,\ f,\ c} = 0$.

In one embodiment, the MPE MAC CE includes one additional bit for each pair of virtual P-MPR and SSBRI or CRI to indicate whether the virtual P-MPR is less than 3 dBm. Each SSB or CSI-RS resource is indicated by an SSBRI/CRI field that has a bit width depending on the maximum number of SSB or CSI-RS resources within the candidate resource pool for the cell. In particular, the SSBRI/CRI field with value k indicates the $(k+1)^{th}$ resource configured in the candidate resource pool for the cell.

In one embodiment, the method further comprises determining a UL TCI state or a UL TX beam for UL transmission after receiving the MPE MAC CE. In particular, after Y symbols from a last symbol of transmission of a PDCCH carrying a DCI, that has a toggled NDI field value, scheduling a PUSCH transmission with the same HARQ process number as that for the reception of the PUSCH carrying the MPE MAC CE, the UL TCI state including, as spatial relation, the DL RS indicated by a first reported SSBRI or CRI among the reported SSBRI(s) or CRI(s), the indicated SSB or CSI-RS resource(s) of which are included in the UL TCI states for UL transmission is determined as the common UL TCI state, where Y is preconfigured or reported as part of UE capability. Alternatively, after Y symbols from a last symbol of transmission of a PDCCH carrying a DCI, that has a toggled NDI field value, scheduling a PUSCH transmission with the same HARQ process number as that for the reception of the PUSCH carrying the MPE MAC CE, the SSB or CSI-RS resource indicated by a first reported SSBRI or CRI is used to determine the UL TX beam for PUSCH and PUCCH transmission before receiving a joint DL/UL TCI state updating command or a UL TCI state updating command, where Y is preconfigured or reported as part of UE capability.

In one embodiment, the method may further comprise transmitting a DCI to trigger an aperiodic CSI reporting for UL beam management after receiving the MPE MAC CE. The triggered aperiodic CSI reporting is associated with an aperiodic CSI resource set containing at least one CSI-RS resource with higher layer parameter repetition set to on, and the at least one CSI-RS resource is a CSI-RS resource indicated by the SSBRI/CRI field of the MPE MAC CE, or QCLed with an SSB or CSI-RS resource indicated by the SSBRI/CRI field of the MPE MAC CE, or a CSI-RS resource that has the same source QCL-TypeD RS as a CSI-RS resource indicated by the SSBRI/CRI field of the MPE MAC CE.

In some embodiment, the method may further comprise receiving a capability on the maximum number of SSB or CSI-RS resources that can be configured in the resource pool for the cell for MPE detection.

FIG. 5 is a schematic block diagram illustrating apparatuses according to one embodiment.

Referring to FIG. 5, the UE (i.e. the remote unit) includes a processor, a memory, and a transceiver. The processor implements a function, a process, and/or a method which are proposed in FIG. 3.

The UE comprises a processor that selects, in response to MPE event being detected, N SSB or CSI-RS resources according to the virtual PH of each SSB or CSI-RS resource within a candidate resource pool for a cell, where N is an integer equal to or larger than 1, wherein each virtual PH is computed by $PH_v = \tilde{P}_{c,max,f,\ c} - \{P_{O\_PUSCH,b,\ f,\ c} + \alpha \cdot PL(q_d) + f_{b,\ f,\ c}\}$, where $\tilde{P}_{c,max,f,\ c}$ is computed assuming MPR=0 dB, A-MPR=0 dB, $\Delta T_c = 0$ and P-MPR is the virtual P-MPR of the resource, $PL(q_d)$ is the DL channel pathloss calculated by taking the SSB or CSI-RS resource as the PL-RS, $P_{O\_PUSCH,b,\ f,\ c}$ and $\alpha$ are obtained by the power control parameters used for PUSCH associated with the current indicated UL TCI state with separate DL and UL TCI or the joint DL/UL TCI state with joint DL/UL TCI, or it is assumed that $P_{O\_PUSCH,b,\ f,\ c} = 0$ and $\alpha = 1$, and $f_{b,\ f,\ c} = 0$; and a transmitter that transmits an MPE MAC CE including P-MPR of the MPE event and N pairs of virtual P-MPR and SSBRI or CRI, each SSBRI or CRI corresponds to one of the selected N SSB or CSI-RS resources.

In one embodiment, the MPE MAC CE includes one additional bit for each pair of virtual P-MPR and SSBRI or CRI to indicate whether the virtual P-MPR is less than 3 dBm. Each SSB or CSI-RS resource is indicated by an SSBRI/CRI field that has a bit width depending on the maximum number of SSB or CSI-RS resources within the candidate resource pool for the cell. In particular, the SSBRI/CRI field with value k indicates the $(k+1)^{th}$ resource configured in the candidate resource pool for the cell.

In one embodiment, the processor further determines a UL TCI state or a UL TX beam for UL transmission after the transmitter transmits the MPE MAC CE. In particular, after Y symbols from a last symbol of reception of a PDCCH carrying a DCI, that has a toggled NDI field value, scheduling a PUSCH transmission with the same HARQ process number as that for the transmission of the PUSCH carrying the MPE MAC CE, the UL TCI state including, as spatial relation, the DL RS indicated by a first reported SSBRI or CRI among the reported SSBRI(s) or CRI(s), the indicated SSB or CSI-RS resource(s) of which are included in the UL TCI states for UL transmission is determined as the common UL TCI state, where Y is preconfigured or reported as part of UE capability. Alternatively, after Y symbols from a last symbol of reception of a PDCCH carrying a DCI, that has a toggled NDI field value, scheduling a PUSCH transmission with the same HARQ process number as that for the transmission of the PUSCH carrying the MPE MAC CE, the SSB or CSI-RS resource indicated by a first reported SSBRI or CRI is used to determine the UL TX beam for PUSCH and PUCCH transmission before receiving a joint DL/UL TCI state updating command or a UL TCI state updating command, where Y is preconfigured or reported as part of UE capability.

In one embodiment, the UE may further comprise a receiver that receives a DCI to trigger an aperiodic CSI reporting for UL beam management after the transmitter transmits the MPE MAC CE. The triggered aperiodic CSI reporting is associated with an aperiodic CSI resource set containing at least one CSI-RS resource with higher layer parameter repetition set to on, and the at least one CSI-RS resource is a CSI-RS resource indicated by the SSBRI/CRI field of the MPE MAC CE, or QCLed with an SSB or CSI-RS resource indicated by the SSBRI/CRI field of the MPE MAC CE, or a CSI-RS resource that has the same source QCL-TypeD RS as a CSI-RS resource indicated by the SSBRI/CRI field of the MPE MAC CE.

In some embodiment, the method may further comprise a transmitter that transmits a capability on the maximum number of SSB or CSI-RS resources that can be configured in the resource pool for the cell for MPE detection.

The gNB (i.e. the base unit) includes a processor, a memory, and a transceiver. The processor implements a function, a process, and/or a method which are proposed in FIG. 4.

The base unit comprises a receiver that receives an MPE MAC CE including P-MPR of a detected MPE event and N pairs of virtual P-MPR and SSBRI or CRI, each SSBRI or CRI corresponds to one of N SSB or CSI-RS resources within a candidate resource pool for a cell, wherein N SSB or CSI-RS resources are selected in response to detecting the MPE event according to virtual PH of each SSB or CSI-RS resource, and where N is an integer equal to or larger than 1, wherein each virtual PH is computed by $PH_v = \tilde{P}_{c,max,f,\ c} - \{P_{O\_PUSCH,b,\ f,\ c} + \alpha \cdot PL(q_d) + f_{b,\ f,\ c}\}$, where $\tilde{P}_{c,max,f,\ c}$ is computed assuming MPR=0 dB, A-MPR=0 dB, $\Delta T_c = 0$ and P-MPR is the virtual P-MPR of the resource, $PL(q_d)$ is the DL channel pathloss calculated by taking the SSB or CSI-RS resource as the PL-RS, $P_{O\_PUSCH,b,\ f,\ c}$ and $\alpha$ are obtained by the power control parameters used for PUSCH associated with the current indicated UL TCI state with separate DL and UL TCI or the joint DL/UL TCI state with joint DL/UL TCI, or it is assumed that $P_{O\_PUSCH,b,\ f,\ c} = 0$ and $\alpha = 1$, and $f_{b,\ f,\ c} = 0$.

In one embodiment, the MPE MAC CE includes one additional bit for each pair of virtual P-MPR and SSBRI or CRI to indicate whether the virtual P-MPR is less than 3 dBm. Each SSB or CSI-RS resource is indicated by an SSBRI/CRI field that has a bit width depending on the maximum number of SSB or CSI-RS resources within the candidate resource pool for the cell. In particular, the SSBRI/CRI field with value k indicates the $(k+1)^{th}$ resource configured in the candidate resource pool for the cell.

In one embodiment, the base unit further comprises a processor that determines a UL TCI state or a UL TX beam for UL transmission after receiving the MPE MAC CE. In particular, after Y symbols from a last symbol of transmission of a PDCCH carrying a DCI, that has a toggled NDI field value, scheduling a PUSCH transmission with the same HARQ process number as that for the reception of the PUSCH carrying the MPE MAC CE, the UL TCI state including, as spatial relation, the DL RS indicated by a first reported SSBRI or CRI among the reported SSBRI(s) or CRI(s), the indicated SSB or CSI-RS resource(s) of which are included in the UL TCI states for UL transmission is determined as the common UL TCI state, where Y is preconfigured or reported as part of UE capability. Alternatively, after Y symbols from a last symbol of transmission of a PDCCH carrying a DCI, that has a toggled NDI field value, scheduling a PUSCH transmission with the same HARQ process number as that for the reception of the PUSCH carrying the MPE MAC CE, the SSB or CSI-RS resource indicated by a first reported SSBRI or CRI is used to determine the UL TX beam for PUSCH and PUCCH transmission before receiving a joint DL/UL TCI state updating command or a UL TCI state updating command, where Y is preconfigured or reported as part of UE capability.

In one embodiment, the base unit may further comprise a transmitter that transmits a DCI to trigger an aperiodic CSI reporting for UL beam management after receiving the MPE MAC CE. The triggered aperiodic CSI reporting is associated with an aperiodic CSI resource set containing at least one CSI-RS resource with higher layer parameter repetition set to on, and the at least one CSI-RS resource is a CSI-RS resource indicated by the SSBRI/CRI field of the MPE MAC CE, or QCLed with an SSB or CSI-RS resource indicated by the SSBRI/CRI field of the MPE MAC CE, or a CSI-RS resource that has the same source QCL-TypeD RS as a CSI-RS resource indicated by the SSBRI/CRI field of the MPE MAC CE.

In some embodiment, the base unit may further comprise a receiver that receives a capability on the maximum number of SSB or CSI-RS resources that can be configured in the resource pool for the cell for MPE detection.

Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated in the appended claims rather than by the foregoing description. All changes which come within the meaning and range of equivalency of the claims are to be embraced within their scope.

The invention claimed is:

1. A user equipment (UE) for wireless communication, comprising:

at least one memory; and at least one processor coupled with the at least one memory and configured to cause the UE to:

transmit a capability on a maximum number of synchronization signal and physical broadcast channel (PBCH) block (SSB) or channel state information reference signal (CSI-RS) resources that can be configured in a resource pool for maximum permissible exposure (MPE) detection; and transmit a MPE medium access control (MAC) control element (MAC CE) including:

a first field, where if mpe-Reporting-FR2 is configured indicating that MPE detection is enabled, and a serving cell operates on frequency range 2 (FR2), the first field has a value of 0 if an estimated power management maximum power reduction (P-MPR) value, to meet MPE requirements, is less than a first P-MPR value, and a value of 1 if the estimated P-MPR value is not less than the first P-MPR value, a second field, where if mpe-Reporting-FR2 is configured, and the serving cell operates on FR2, and if the first field has a value of 1, the second field indicates an applied power backoff to meet the MPE requirements, a third field that indicates a synchronization signal (SS)/PBCH block indicator (SSBRI) or CSI-RS resource indicator (CRI), which indicates an SSB or CSI-RS resource configured in a candidate resource pool for the serving cell.

2. The UE of claim 1, wherein the first P-MPR value comprises P-MPR_00.

3. The UE of claim 1, wherein the third field comprises a CSI-RS resource field that indicates the CSI-RS resource.

4. The UE of claim 1, wherein the third field comprises a ID resource ID field that indicates the SSB resource.

5. The UE of claim 1, wherein the MPE MAC CE includes one additional bit for each pair of virtual P-MPR and SSBRI or CRI to indicate whether the virtual P-MPR is less than 3 dBm.

6. The UE of claim 1, wherein each SSB or CSI-RS resource is indicated by an SSBRI or CRI field that has a bit width depending on a maximum number of SSB or CSI-RS resources within the candidate resource pool for the serving cell.

7. The UE of claim 1, wherein the at least one processor is further configured to cause the UE to:

determine an uplink (UL) transmission configuration indication (TCI) state or an UL transmitter (TX) beam for UL transmission after transmitting the MPE MAC CE.

8. The UE of claim 7, wherein the at least one processor is further configured to cause the UE to, after Y symbols from a last symbol of reception of a physical downlink control channel (PDCCH) carrying a downlink control information (DCI) that has a toggled new data indicator (NDI) field value:

schedule a physical uplink shared channel (PUSCH) transmission with a same hybrid automatic repeat request (HARQ) process number as that for the transmission of a PUSCH carrying the MPE MAC CE, wherein the UL TCI state includes, as a spatial relation, a downlink (DL) reference signal (RS) indicated by one or more SSBRIs or CRIs, wherein the indicated SSB or CSI-RS resource that is included in the UL TCI state for UL transmission is determined as a common UL TCI state, and Y is preconfigured or reported as part of UE capability.

9. The UE of claim 7, wherein the at least one processor is further configured to cause the UE to, after Y symbols from a last symbol of reception of a physical downlink control channel (PDCCH) carrying a downlink control information (DCI) that has a toggled new data indicator (NDI) field value:

schedule a physical uplink shared channel (PUSCH) transmission with a same hybrid automatic repeat request (HARQ) process number as that for transmission of a PUSCH carrying the MPE MAC CE, wherein the SSB or CSI-RS resource indicated by a first reported SSBRI or CRI is used to determine an UL TX beam for PUSCH and PUCCH transmission before receiving a joint downlink (DL)/UL TCI state updating command or a UL TCI state updating command, and Y is preconfigured or reported as part of UE capability.

10. The UE of claim 1, wherein the at least one processor is further configured to cause the UE to:

receive a downlink control information (DCI) to trigger an aperiodic channel state information (CSI) reporting for uplink (UL) beam management after transmitting the MPE MAC CE.

11. The UE of claim 10, wherein the triggered aperiodic CSI reporting is associated with an aperiodic CSI resource set including at least one CSI-RS resource with a higher layer parameter repetition set to on, and the at least one CSI-RS resource is:

a CSI-RS resource indicated by an SSBRI/CRI field of the MPE MAC CE, or quasi co-located (QCLed) with an SSB or CSI-RS resource indicated by the SSBRI/CRI field of the MPE MAC CE, or a CSI-RS resource that has a same source QCL-TypeD RS as a CSI-RS resource indicated by the SSBRI/CRI field of the MPE MAC CE.

12. A processor for wireless communication, comprising:

at least one controller coupled with at least one memory and configured to cause the processor to:

transmit a capability on a maximum number of synchronization signal and physical broadcast channel (PBCH) block (SSB) or channel state information reference signal (CSI-RS) resources that can be configured in a resource pool for maximum permissible exposure (MPE) detection; and transmit a MPE medium access control (MAC) control element (MAC CE) including:

a first field, where if mpe-Reporting-FR2 is configured indicating that MPE detection is enabled, and a serving cell operates on frequency range 2 (FR2), the first field has a value of 0 if an estimated power management maximum power reduction (P-MPR) value, to meet MPE requirements, is less than a first P-MPR value, and a value of 1 if the estimated P-MPR value is not less than the first P-MPR value, a second field, where if mpe-Reporting-FR2 is configured, and the serving cell operates on FR2, and if the first field has a value of 1, the second field indicates an applied power backoff to meet the MPE requirements, a third field that indicates a synchronization signal (SS)/PBCH block indicator (SSBRI) or CSI-RS resource indicator (CRI), which indicates an SSB or CSI-RS resource configured in a candidate resource pool for the serving cell.

13. The processor of claim 12, wherein the first P-MPR value comprises P-MPR_00.

14. The processor of claim 12, wherein the third field comprises a CSI RS resource field that indicates the CSI-RS resource.

15. The processor of claim 12, wherein the third field comprises a ID resource ID field that indicates the SSB resource.

16. A base station for wireless communication, comprising:

at least one memory; and at least one processor coupled with the at least one memory and configured to cause the base station to:

receive a capability on a maximum number of synchronization signal and physical broadcast channel (PBCH) block (SSB) or channel state information reference signal (CSI-RS) resources that can be configured in a resource pool for maximum permissible exposure (MPE) detection; and receive a MPE medium access control (MAC) control element (MAC CE) including:

a first field, where if mpe-Reporting-FR2 is configured indicating that MPE detection is enabled, and a serving cell operates on frequency range 2 (FR2), the first field has a value of 0 if an estimated power management maximum power reduction (P-MPR) value, to meet MPE requirements, is less than a first P-MPR value, and a value of 1 if the estimated P-MPR value is not less than the first P-MPR value, a second field, where if mpe-Reporting-FR2 is configured, and the serving cell operates on FR2, and if the first field has a value of 1, the second field indicates an applied power backoff to meet the MPE requirements, a third field that indicates a synchronization signal (SS)/PBCH block indicator (SSBRI) or CSI-RS resource indicator (CRI), which indicates an SSB or CSI-RS resource configured in a candidate resource pool for the serving cell.

17. The base station of claim 16, wherein the first P-MPR value comprises P-MPR_00.

18. The base station of claim 16, wherein the third field comprises a CSI-RS resource field that indicates the CSI-RS resource.

19. The base station of claim 16, wherein the third field comprises a ID resource ID field that indicates the SSB resource.

20. A method performed by a user equipment (UE), the method comprising:

transmitting a capability on a maximum number of synchronization signal and physical broadcast channel (PBCH) block (SSB) or channel state information reference signal (CSI-RS) resources that can be configured in a resource pool for maximum permissible exposure (MPE) detection; and transmitting a MPE medium access control (MAC) control element (MAC CE) including:

a first field, where if mpe-Reporting-FR2 is configured indicating that MPE detection is enabled, and a serving cell operates on frequency range 2 (FR2), the first field has a value of 0 if an estimated power management maximum power reduction (P-MPR) value, to meet MPE requirements, is less than a first P-MPR value, and a value of 1 if the estimated P-MPR value is not less than the first P-MPR value, a second field, where if mpe-Reporting-FR2 is configured, and the serving cell operates on FR2, and if the first field has a value of 1, the second field indicates an applied power backoff to meet the MPE requirements, a third field that indicates a I synchronization signal (SS)/PBCH block indicator (SSBRI) or CSI-RS resource indicator (CRI), which indicates an SSB or CSI-RS resource configured in a candidate resource pool for the serving cell.

* * * * *